United States Patent
Piasecki

(10) Patent No.: US 8,403,255 B2
(45) Date of Patent: Mar. 26, 2013

(54) COMPOUND AIRCRAFT WITH AUTOROTATION

(76) Inventor: Frederick W. Piasecki, Haverford, PA (US)

(*) Notice: Subject to any disclaimer, the term of this patent is extended or adjusted under 35 U.S.C. 154(b) by 179 days.

(21) Appl. No.: 12/757,287

(22) Filed: Apr. 9, 2010

(65) Prior Publication Data

US 2011/0036954 A1 Feb. 17, 2011

Related U.S. Application Data

(60) Provisional application No. 61/234,051, filed on Aug. 14, 2009.

(51) Int. Cl.
*B64C 27/22* (2006.01)

(52) U.S. Cl. ......... 244/6; 244/7 A; 244/17.11; 244/12.3; 244/8

(58) Field of Classification Search ............. 244/6, 7, 244/7 R, 8, 10, 12.2, 12.3, 17.11, 7 A
See application file for complete search history.

(56) References Cited

U.S. PATENT DOCUMENTS

| 3,884,431 A | * | 5/1975 | Burrell | 244/7 A |
| 2004/0093130 A1 | * | 5/2004 | Osder et al. | 701/3 |
| 2005/0151001 A1 | * | 7/2005 | Loper | 244/6 |

FOREIGN PATENT DOCUMENTS

WO  WO 2006004416 A1 * 1/2006

* cited by examiner

*Primary Examiner* — Timothy D Collins
*Assistant Examiner* — Nicholas McFall
(74) *Attorney, Agent, or Firm* — Lipton, Weinberger & Husick; Robert J. Yarbrough

(57) ABSTRACT

A compound aircraft features variable incidence wings, a thruster, a rotor and a clutch connecting the engines to the rotor. Upon reaching a suitable forward speed, the control system of the compound aircraft unloads the rotor and disengages the clutch, disconnecting the rotor from the engines. The control system configures the cyclic and collective pitch effectors to cause the rotor to autorotate. The control system selects an autorotation rotational speed that is adequately rapid to prevent excessive deformation of the rotor blades due to aerodynamic forces acting on the blade and that is adequately slow to prevent excessive compressibility effects.

9 Claims, 10 Drawing Sheets

COMPOUND AIRCRAFT WITH AUTOROTATION

STATEMENT OF RELATED APPLICATIONS

This application is entitled to priority from U.S. Provisional Patent Application 61/234,051 titled "Compound Aircraft" and filed Aug. 14, 2009.

BACKGROUND OF THE INVENTION

A. Field of the Invention

The Invention is a compound aircraft that utilizes autorotation of the rotor to allow reduction in the rotational speed of the rotor during flight while avoiding instability of the rotor and excess deformation of the rotor blades due to aerodynamic forces resulting from the forward motion of the aircraft. The Invention is also a method of flight utilizing the compound aircraft of the invention.

B. Description of the Related Art

1. Compound Aircraft

A 'compound' aircraft is an aircraft that includes features of both fixed wing aircraft and rotary wing aircraft. The compound aircraft includes the elements of a helicopter, including at least one powered main rotor and a mechanism to overcome the torque reaction of the rotating main rotor. The compound aircraft also includes elements of a fixed-wing aircraft, such as a wing. The wing may be equipped with ailerons, flaps or a combination of flaps and ailerons known as 'flaperons.' The compound aircraft may be equipped with a separate thrust mechanism to drive the aircraft forward, such as a propeller in a ducted fan. Through the use of appropriate vanes or sectors that change the configuration of the duct, the ducted fan may serve as the mechanism to overcome the torque reaction of the rotating rotor blades and to provide yaw control.

The rotor blades of both a conventional helicopter and a compound aircraft are long and flexible compared to a fixed wing. A conventional helicopter and a compound aircraft both have operating limitations relating to the interaction of the forward speed of the aircraft and the rotation of the long, flexible blades. When a helicopter or compound aircraft is moving forward, a rotating rotor blade moving toward the front of the aircraft is 'advancing.' When the rotor blade is moving toward the rear of the aircraft, the blade is 'retreating.' As the forward speed of a helicopter or compound aircraft increases, the airspeed of an advancing rotor blade increases and the airspeed of a retreating blade decreases. As the local airspeed of the advancing blade approaches the speed of sound, shock waves occur that change the lift along the blade, apply torsion to the blade, increase drag and power requirements, and increase noise. These results of local airspeed on a helicopter or compound aircraft rotor blade are known collectively as 'compressibility effects.'

As the speed of the aircraft in the forward direction increases, the local airspeed of the retreating rotor blade will decrease. As the forward speed of the aircraft continues to increase, the retreating blade progressively will lose lift and may eventually stall. To maintain lift generated by the retreating rotor and to prevent stalling, the rotational speed of the rotor must increase. Increasing the rotor speed to avoid retreating blade stall and loss of lift exacerbates the compressibility effects on the advancing blade.

These competing phenomena of 'compressibility effects' and 'retreating blade stall' limit the forward speed of helicopters and compound aircraft.

2. Autogyro

An autogyro is an aircraft that features a rotor and a propeller or other thruster that impels the aircraft in a forward direction. The autogyro differs from helicopters and compound aircraft in that the rotor is not powered. Air moving through the unpowered rotor disc from the underside of the rotor disc to the top of the rotor disc causes the rotor to rotate. The passively turning rotor provides lift to the aircraft. The autogyro rotor may be powered prior to takeoff to start the rotor turning. Any autogyro must move forward through the air to cause the rotor to turn and to allow the aircraft to maintain flight. An autogyro is not capable of a sustained hover in which the airspeed of the autogyro is zero.

The rotor of an autogyro passively spins in a stable manner due to a self-correcting balance of forces acting on the rotor blades due to the forward motion of the aircraft. Air passing through the rotor disc from below generates lift and drag forces that depend on the local angle of attack of the rotor blade, the rotational speed of the rotor and the forward speed of the aircraft. If the resultant force acting on a particular location of the rotor blade is ahead of the axis of rotation of the rotor, that portion of the rotor tends to speed up. If the local resultant force is behind the axis of rotation, that portion of the rotor tends to slow down. For a blade of constant pitch, the resultant forces along the inner portions of the blade closer to the hub will be ahead of those toward the outer portion of the blade closer to the tip. The forces acting on the inner portion of the blade therefore tend to accelerate the rotation of the blade, while the forces action on the outer portion of the blade tend to slow rotation of the blade.

The forces acting on the advancing and retreating blades also are different. A location on the retreating blade experiences a greater local angle of attack than does a corresponding location on the advancing blade due to the rotation of the blade and the forward motion of the aircraft. More of the retreating blade therefore tries to accelerate the rotor, while more of the leading blade tries to decelerate the rotor. The net result is a balance of forces and a stable rotational speed of the rotor.

Rotation of an aircraft rotor as a result of air moving from the bottom side of the rotor disc to the top side of the rotor disc as in an autogyro is referred to herein as 'autorotation.'

The Invention is not taught by the prior art of autogyros, helicopters or compound aircraft.

BRIEF DESCRIPTION OF THE INVENTION

A. Overview

A compound aircraft features fuselage, variable incidence wings mounted to the fuselage, an engine mounted to the fuselage, a rotor connected to the engine through a clutch and a thruster that is connected to the engine. The compound aircraft also may include control surfaces such as a rudder, stabilizer or stabilator. The variable incidence wings are rotatable about a wing axis of rotation with respect to the fuselage to change the angle of attack of the wings. The variable incidence wings may feature ailerons or flaperons. The thruster may be a ducted propeller.

The clutch allows the rotor transmission and hence the rotor to be selectably disconnected from the high speed output of the engine during flight when the compound aircraft reaches an adequately high forward speed for the variable incidence wings and the rotor in autorotation to generate enough lift to support the weight of the compound aircraft. A control system controls all of the control effectors of the compound aircraft, including the effectors operating the clutch, the engine power command, the cyclic and collective pitch of the rotor blades, the pitch of the propeller of the thruster, the incidence of the variable incidence wing and the position of all control surfaces.

When the compound aircraft achieves an adequately high forward speed for the variable incidence wings and passively rotating rotor to generate enough lift to support the aircraft, the control system transitions to autorotation of the rotor. To transition to autorotation, the control system unloads the rotor by selecting an angle of attack for the variable incidence wing so that the wing supports a predetermined portion of the weight of the aircraft. The control system contemporaneously feathers the rotor, reducing the lift generated by the rotor and reducing the power consumed by the rotor. The control system also increases the angle of attack of the thruster blades, transferring engine power to the thruster from the rotor. The control system then disengages the clutch. As the clutch is disengaged, the control system orients the rotor disc to autorotate at an adequately low autorotation rotational speed to avoid advancing blade compressibility effects, but at an adequately high autorotation rotational speed to maintain the mechanical stability of the rotor through the inertia of the rotating rotor blades.

Maintaining an adequate rotational speed of the rotor blades when the clutch is disengaged prevents instability and excess deformation of the long, flexible rotor blades due to aerodynamic forces acting on the rotor blades. The aerodynamic forces are generated by the forward motion of the aircraft in combination with the rotation of the blades. Instability and excess deformation of the rotor blades would cause excess vibration and could result in catastrophic failure of the blades.

B. Hovering Flight and Low Speed Operation

For hovering flight and low speed operation, the clutch of the compound aircraft is engaged and engine power is applied directly to the rotor through the rotor transmission. The powered rotor is configured to support the aircraft in the air during vertical takeoff, in hovering flight, and during low-speed maneuvering, just as the rotor of a conventional helicopter supports the helicopter in the air.

For a vertical takeoff of the compound aircraft, the control system engages the clutch, connecting the engine to the rotor transmission. The control system runs the rotor up to speed. The control system then simultaneously increases the collective pitch of the rotor and commands the engine to produce more power. The rotor blades generate lift and the compound aircraft rises vertically.

To move the hovering compound aircraft forward at low speed, the pilot or control system pitches the rotor disc and hence the aircraft forward by adjusting the cyclic pitch, engine power command and collective pitch. The cyclic pitch of the rotor pitches the aircraft forward and the increased lift of the rotor impels the aircraft in the forward direction. The pilot or control system also may move the compound aircraft forward by increasing the forward thrust of the thruster, such as by increasing the pitch of the blades of a ducted propeller. During operations when the compound aircraft is supported by the powered rotor, air is moving from the top of the rotor disc to the bottom of the rotor disc by the power applied directly to the rotor from the engine through the mechanical rotor transmission.

The variable incidence wings of the compound aircraft have a cruise position and a hover position. When in the cruise position, the variable incidence wings are oriented with the leading edge of the wings oriented toward the front of the aircraft and the chord of the wings generally parallel to the forward direction of the aircraft. The variable incidence wings in the cruise position are configured to generate lift from the forward motion of the aircraft. In the hover position, the variable incidence wings are oriented with the leading edge oriented toward the rotor and the chord generally parallel to the rotor axis of rotation. The hover position of the variable incidence wings reduces the effects of downwash from the rotor on the variable incidence wings. As the forward speed of the accelerating aircraft increases, the control system moves the variable incidence wings from the hover to the cruise position through intermediate positions selected to generate the maximum lift from the variable incidence wings consistent with minimum drag.

C. Transition to High Speed Operation

Sensors detect the flight condition of the aircraft, including altitude, air temperature, airspeed, attitude, rotational speed of the rotor, rotor blade pitch and variable incidence wing orientation, among others. As the forward speed of the aircraft increases, more lift is generated by the variable incidence wings and less lift is required from the rotor. The control system detects the flight conditions of the aircraft and reduces the collective pitch of the rotor, reducing the power consumed by the rotor and reducing the lift generated by the rotor. The additional engine power is available for use by the thruster. The pitch of the thruster blades is increased, increasing the engine power directed to the thruster and increasing the forward thrust of the aircraft.

As the aircraft reaches a forward airspeed at which the variable incidence wings and the autorotating rotor would be capable of generating enough lift to supporting the weight of the aircraft, the control system initiates a transition to autorotation operation. During the transition, the control system unloads the rotor by feathering the rotor blades. The control system then disengages the clutch, cutting all engine power to the rotor and directing all power to the thruster. Concurrent with disengagement of the clutch, the control system selects cyclic and collective pitch effector settings to tilt the rotor disc aft so that the forward speed of the aircraft causes air to pass from the bottom to the top side of the rotor disc, resulting in autorotation of the rotor.

A range of airspeeds of the compound aircraft are suitable for transition to variable incidence wing and autorotating flight. As an upper bound, the control system will cause the transition from powered rotor flight to autorotation flight to occur at an airspeed below that which would cause the rotor blade to exceed predetermined allowable advancing blade compressibility effects or that would cause unacceptable retreating blade stall.

D. High Speed Operation

During high speed operation, the clutch is not engaged and the rotor is unpowered. The aircraft is supported by lift generated by air flowing over the variable incidence wings due to the forward speed of the aircraft and by lift generated by autorotation of the rotor. The aircraft is impelled forward by engine power supplied to the thruster. The collective and cyclic pitch of the rotor blades are commanded by the control system to maintain the rotor disc in a pitched-aft attitude so that air passes from the bottom side of the rotor disc to the top side of the rotor disc as the aircraft moves forward. The air moving through the rotor disc maintains the steady autorotation of the rotor.

For a compound aircraft moving at a high forward speed, the inertial forces acting on the rotor blades due to rotation of the rotor, including autorotation of the rotor, tend to stabilize the blades while the aerodynamic forces acting on the blades due to wind pressure from the forward motion of the aircraft tend to destabilize the blades. When the rotor is rotating at a high rotational speed, the inertial forces overwhelm the aerodynamic forces, resulting in stable rotation of the blades.

When the rotational speed of the rotor is too low compared to the forward speed of the aircraft, the destabilizing aerodynamic forces due to the forward motion of the aircraft may overcome the stabilizing inertial forces of the rotating blades, resulting in instability and potentially catastrophic failure of the blades.

As used in this document, the term 'inertial forces' means the forces acting on the rotor blade due to the rotating mass of the blade. As used in this document, the term 'aerodynamic forces' means the forces acting on the rotor blade due to the movement of air with respect to the blade resulting from the forward motion of the compound aircraft in combination with the rotation of the blade.

The control system constantly monitors aircraft condition and selects effector positions for collective and cyclic pitch to achieve a rotational speed of the rotor that is low enough to avoid compressibility effects of the advancing rotor blade but that is high enough so that the inertial forces of the rotating blade are adequate to maintain the mechanical stability of the rotating blades, with an adequate factor of safety, to prevent instability of the blades and hence excess deformation of the blade due to aerodynamic forces.

If additional lift is required, the control system can be configured to select collective and cyclic pitch effector settings that cause the autorotating rotor to generate lift to augment the lift generated by the variable incidence wings.

DESCRIPTION OF AN EMBODIMENT

Figure 1:
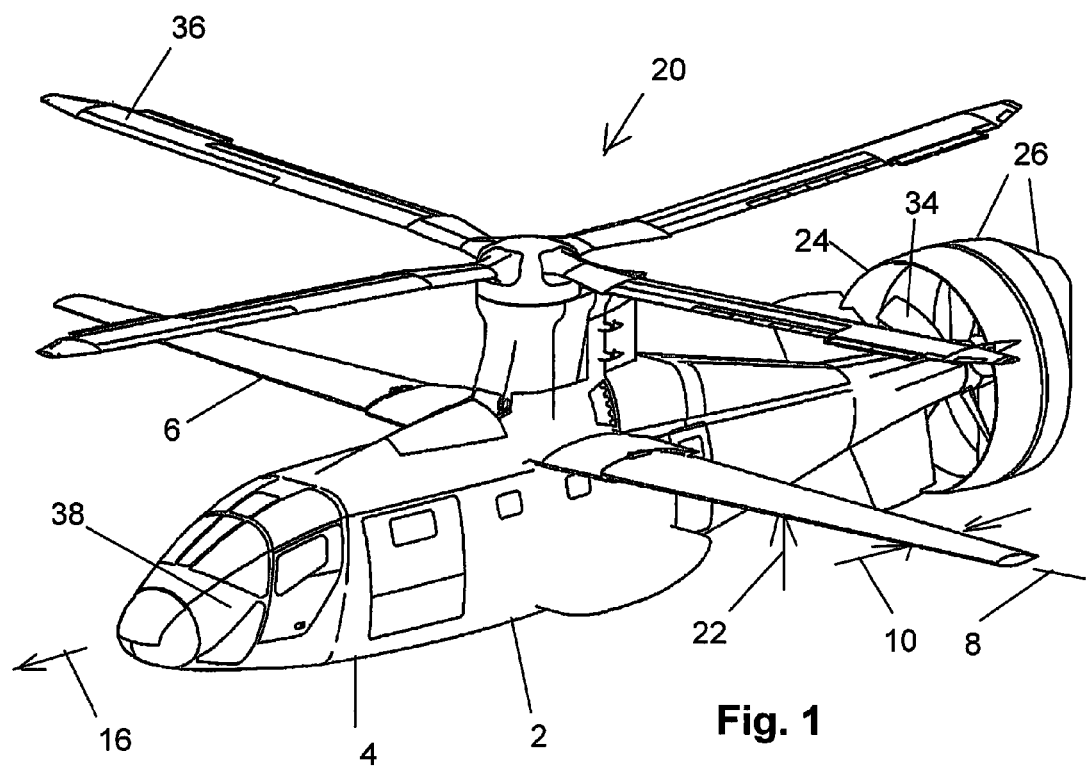
FIG. 1 is a perspective view of the compound aircraft.
Figure 2:
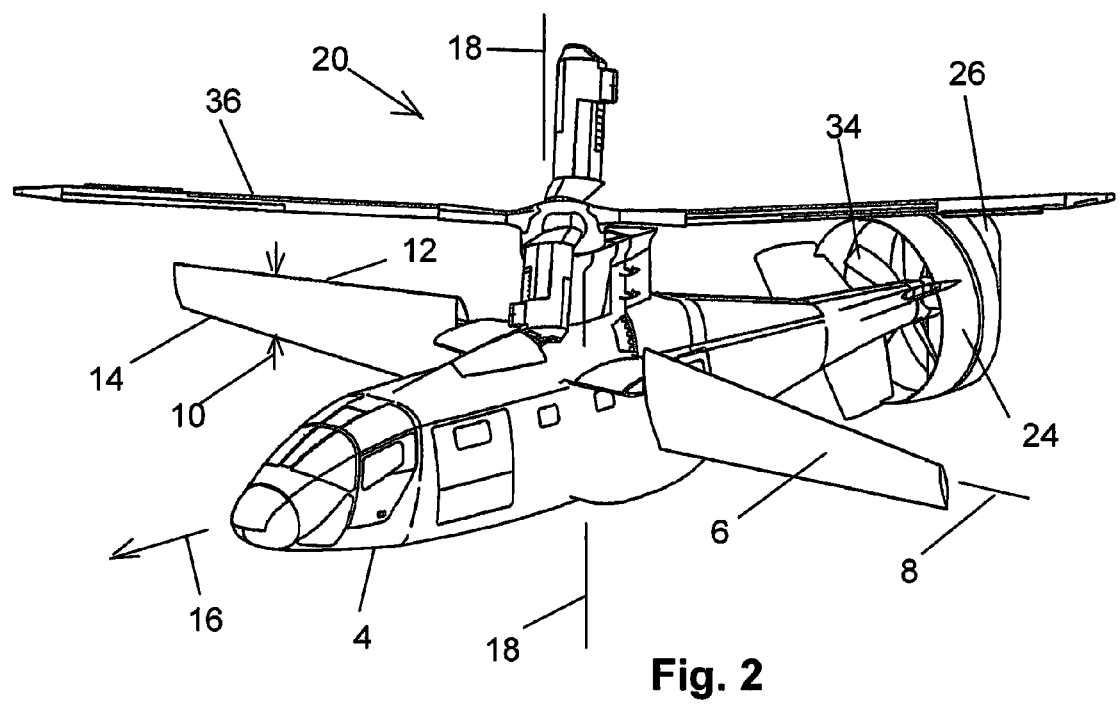
FIG. 2 is a perspective view of the compound aircraft with the variable incidence wings in the hover position.
Figure 3:
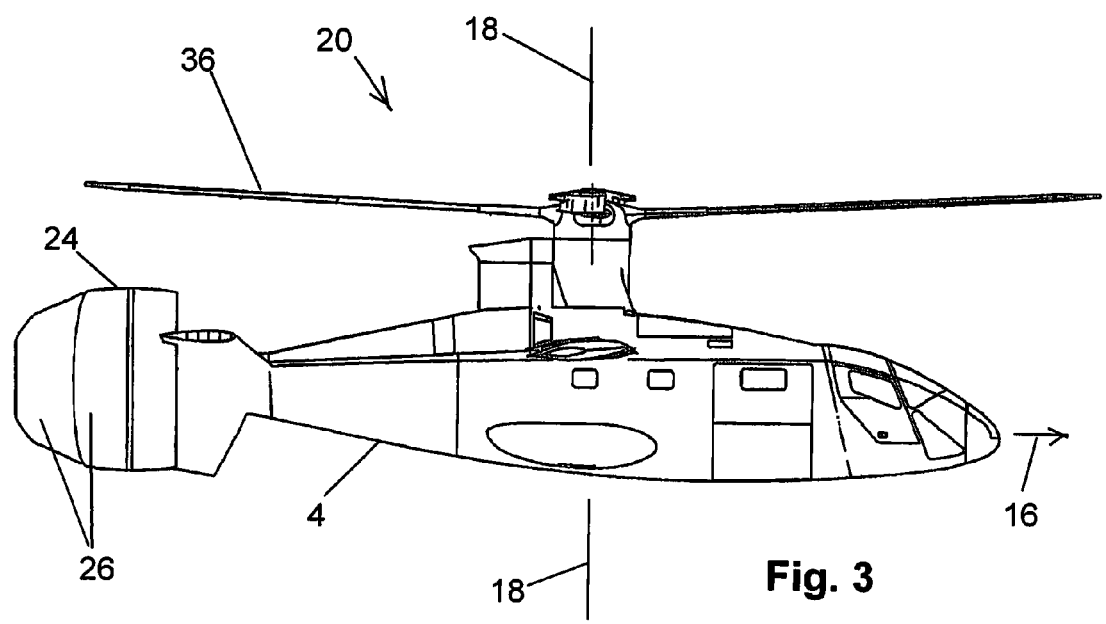
FIG. 3 is a side view of the compound aircraft.
Figure 4:
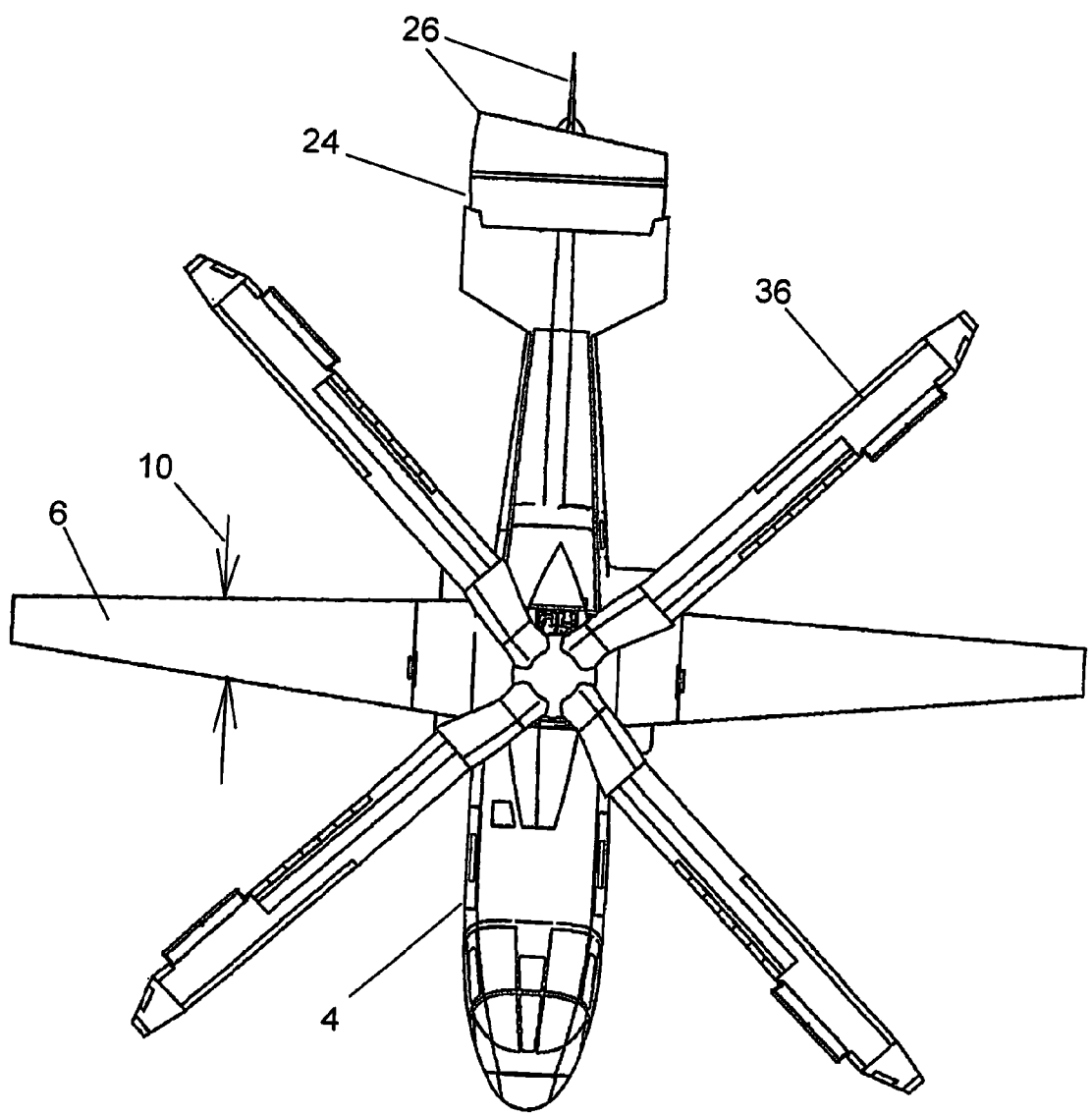
FIG. 4 is a top view of the compound aircraft.
Figure 5:
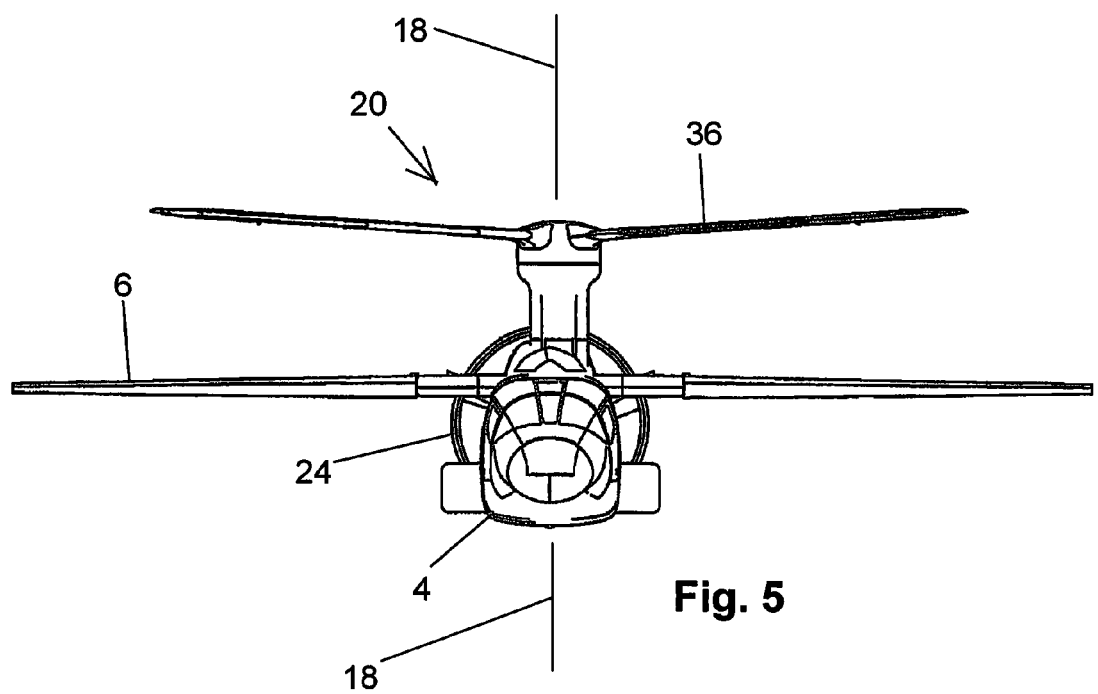
FIG. 5 is a front view of the compound aircraft.

FIGS. 1-5 are views of the compound aircraft 2. The compound aircraft 2 features a fuselage 4. A variable incidence wing 6 is attached to fuselage 4. Variable incidence wing 6 is rotatable about a variable incidence wing axis of rotation 8 between a cruise position, shown by FIGS. 1, 3, 4, 5 and 6 and a hover position, shown by FIG. 2. Variable incidence wing 6 defines a chord 10 between the leading edge 12 and trailing edge 14. When the variable incidence wing is in the cruise position shown by FIG. 1, the chord 10 is oriented generally in the forward direction 16. When the variable incidence wing is in the hover position, the chord 10 is oriented generally parallel to the axis of rotation 18 of the rotor 20, as shown by FIG. 2.

When the variable incidence wing 6 is oriented with chord 10 in the forward direction 16, the variable incidence wing is configured to generate lift 22 in response to air movement over variable incidence wing 6 due to the motion of the compound aircraft 2 in the forward direction 16 in the same manner that a wing of a conventional fixed-wing aircraft generates lift. When the variable incidence wing 6 is in the hover position of FIG. 2, the variable incidence wing 6 is oriented to present the least resistance to the downwash generated by the rotor 20 when the rotor 20 is powered. Variable incidence wing 6 has positions intermediate between the cruise and hover positions.

A thruster 24 in the form of a ducted propeller 34 is attached to fuselage 4. The thruster 24 provides forward thrust to the fuselage 4. The thruster 24 also features vanes and sectors 26 to direct the flow of air from the thruster 24 to react the torque reaction of the rotor 20 when the rotor 20 is under power.

Figure 6:
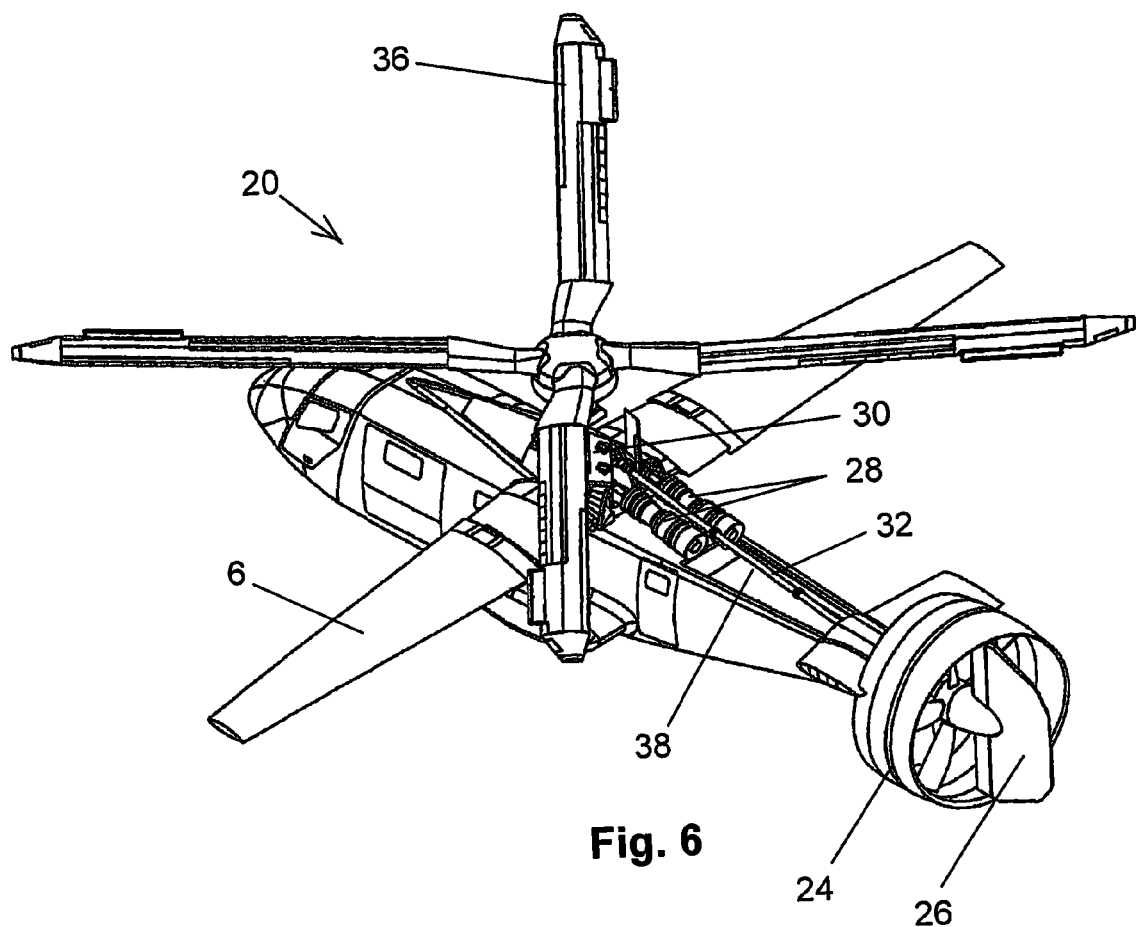
FIG. 6 is a partial cutaway showing the rotor drive system.

FIG. 6 is a partial cutaway showing the power generation and transmission components of the compound aircraft 2. A pair of engines 28 provides power. A clutch 30 connects the engines to the rotor 20. When the clutch 30 is engaged and the engines 28 are producing power, the mechanical power transmission system 32 rotates the rotor 20 about the rotor axis of rotation 18. The rotor 20 has rotor blades 36, which rotate about rotor axis of rotation 18. When the clutch 30 is disengaged, the engines 28 are disconnected from the rotor 20, including the rotor blades 36.

When the clutch 30 is engaged and the engines 28 are turning the rotor 20, the torque applied to the rotor 20 by the engines 28 tends to turn the fuselage 4 in the direction opposite to the direction of rotation of the rotor 20. This 'torque reaction' is common to conventional helicopters and is overcome by the thruster 24. The engines 28 are attached by the mechanical power transmission system 32 to the thruster 24. When the engines 28 are producing power, the propeller 34 of the thruster 24 is rotating. When the clutch 30 is engaged and the engines 28 are turning the rotor 20, sectors 26 are deployed to direct the air from the thruster propeller 34 in a direction counter to the direction of rotation of the rotor 20, countering the torque reaction of the rotor 20.

The thruster 24 also generates a selectable forward thrust. The forward thrust is selectable by selecting the engine power command setting of the engines 28, selecting the pitch of the thruster propeller 34 and selecting the sector 26 settings of the thruster 24. The thruster 24 can provide both reaction forces to counter the torque reaction and forward thrust when the clutch 30 is engaged and the engines 28 are turning the rotor 20. When the clutch 30 is disengaged and the engines 28 are not turning the rotor 20, the torque reaction is eliminated and the thrust of the thruster 24 is no longer diverted to overcome the torque reaction. All of the power of the engines 28 then is available to turn the thruster propeller 34 to provide forward thrust in the forward direction 16.

When the clutch 30 is engaged and the engines 28 are turning the rotor 20, the rotor 20 is capable of supporting the weight of the aircraft 2 in a sustained hovering flight with an airspeed of substantially zero in the same manner that the rotor of a helicopter will support the helicopter in a hovering flight.

Figure 7:
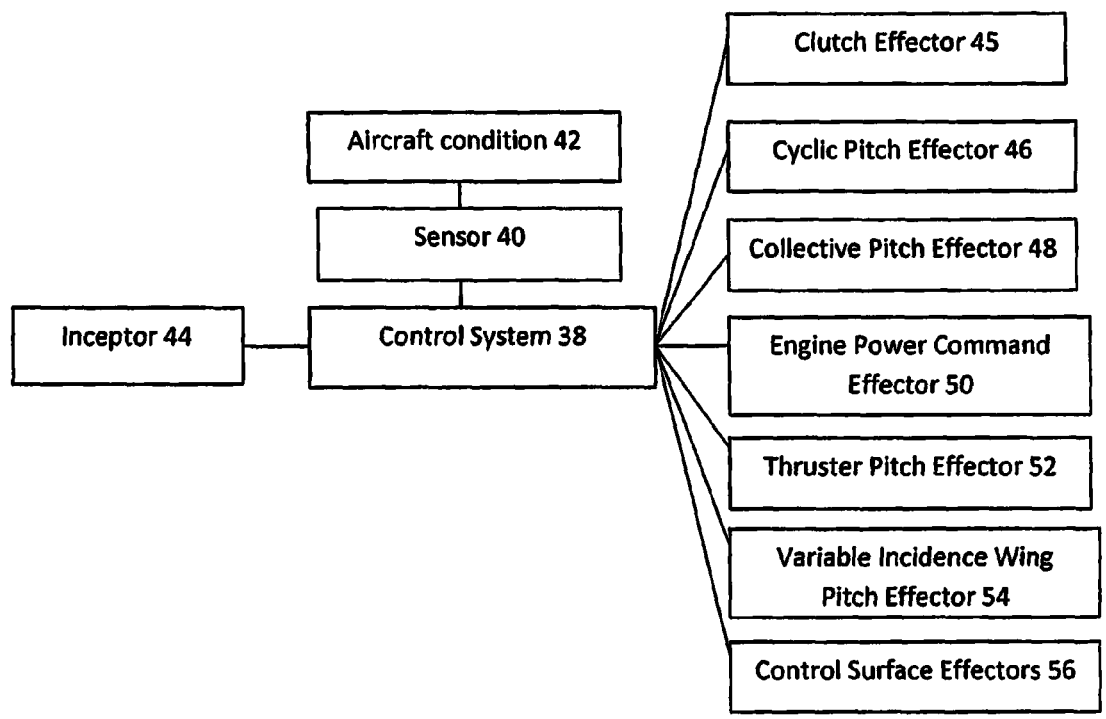
FIG. 7 is a schematic diagram of the control system.

A control system 38 is illustrated schematically by FIG. 7. A sensor 40 detects an aircraft condition 42, such as an airspeed of the fuselage in the forward direction 16. The sensor 40 communicates the aircraft condition 42 to the control system 38. The control system 38 also receives an inceptor 44 input from a human pilot; alternatively, the control system may be an automated 'fly by wire' system without human input. The control system 38 may be mounted to the fuselage 4. Alternatively, the control system 38 may be located at a location remote from the aircraft 2 and the aircraft 2 may be controlled remotely.

The control system 38 selects settings for the various control effectors of the compound aircraft 2. The controls that may be operated by the control system 38 include the following:

Clutch Effector 45—The control system 38 can engage or disengage the clutch 30, removing or restoring engine 28 power to the rotor 20.

Cyclic Pitch Effector 46—The control system 38 may use the cyclic pitch 46, also known as the 'cyclic,' to cause the pitch angle of the rotor blades 36 to change differentially as the main rotor 20 rotates through 360 degrees. The cyclic pitch effector 46 is used to control the pitch and roll of the compound aircraft 2 under power. For example, when the clutch 30 is engaged and the engines 28 are powering the rotor 20, increasing the pitch angle of a rotor blade 36 when the rotor blade 36 is retreating toward the rear of the aircraft 2 and decreasing the pitch angle when the rotor blade 36 is advancing toward the front of the aircraft 2 will cause the main rotor disc 64 to tilt forward and hence will cause the compound aircraft 2 to move forward.

Collective Pitch Effector 48—The control system 38 contemporaneously can change the pitch of all rotor blades 36 by an equal amount using the collective pitch effector 48, also known as the 'collective.' Contemporaneously changing the pitch angle of all rotor blades 36 increases or decreases the lift supporting the compound aircraft 2 when the clutch 30 is engaged and the engines 28 are powering the rotor 20. Increasing the collective and the engine 28 power will cause the compound aircraft to rise. Decreasing the collective and the engine 28 power will call the compound aircraft 2 to sink.

Engine power command effector 50—The control system 38 can control the amount of power that is supplied by the engines 28.

Thruster Pitch Effector 52—The compound aircraft 2 may be equipped with a ducted propeller 34 or other mechanism to provide forward thrust. The propeller 34 of the thruster 24 is connected to the engines 28. Increasing engine 28 power and increasing thruster propeller 34 pitch will increase the thrust of the thruster 24.

Variable incidence wing pitch Effector 54—The variable incidence wings 6 are rotatable about a wing axis of rotation 8. When rotated differentially, the variable incidence wings 6 may impart a roll moment to the aircraft. When rotated in unison, the rotatable variable incidence wings 6 may increase or decrease lift 22 generated by the variable incidence wing 6. In hovering and low speed flight, the wings 6 may be rotated as illustrated by FIG. 2 to the hover position to reduce the effective wing area and hence reduce the downward force on the wings 6 from the downwash of the rotor 20.

Other Control Surface Effectors 56—The other control effectors operated by the control system 38 include the sector 26 controls and rudder so that the thruster 24 presents more or less force countering the torque reaction of the rotating rotor 20, controlling the yaw of the aircraft 2. When the clutch 30 is disengaged, there is no torque reaction to overcome and the sectors 26 are withdrawn. The control system 38 then achieves yaw control with the rudder. The control system 38 may control an elevator or stabilator to control the pitch of the compound aircraft, in cooperation with or instead of the cyclic pitch control. Any other suitable control surface as is known in the art, such as a canard, also may be controlled by the control system 38.

Figure 8:
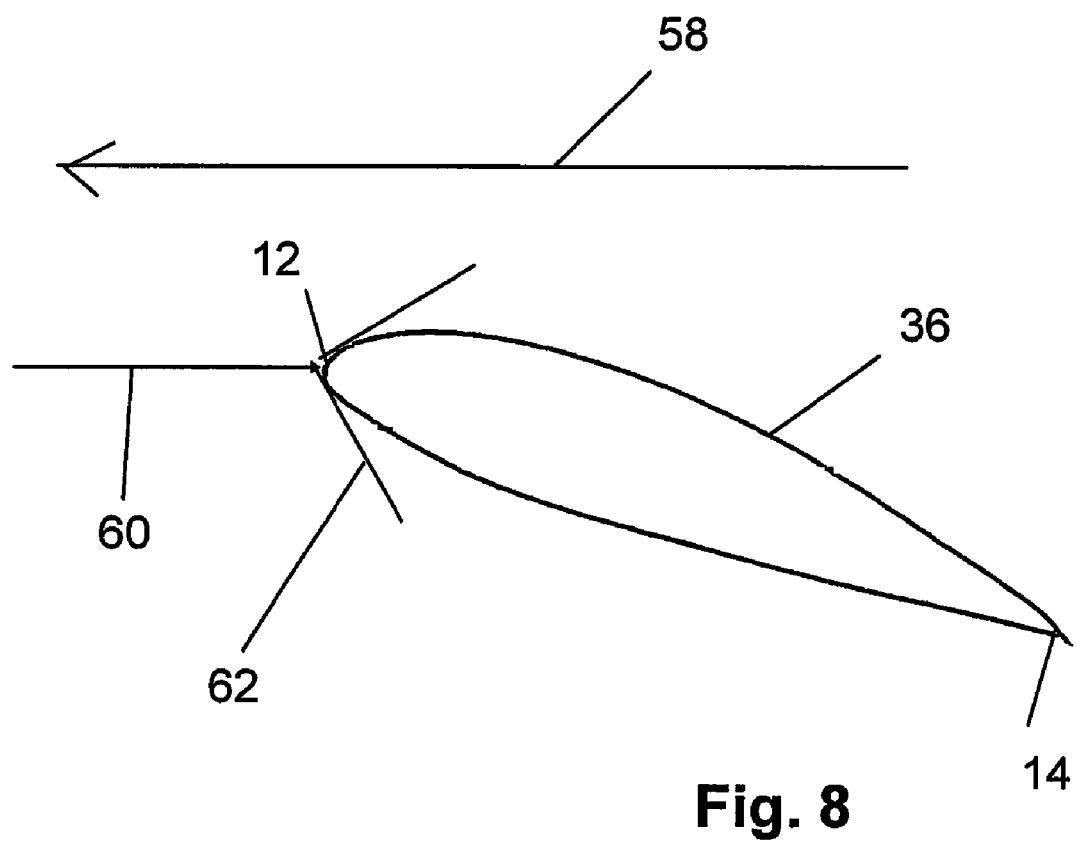
FIG. 8 is a schematic cross section of a rotor blade.

FIG. 8 is a cross section of a rotor blade 36 when the clutch 30 is engaged and engines 28 are powering rotor blade 36. Rotor blade 36 is rotating about the rotor axis of rotation 16 in a direction of rotation 58 at a powered rotational speed. The compound aircraft 2 also is moving in the forward direction 16. A 'relative wind' 60 is blowing against the leading edge 12 of rotor blade 36. The relative wind 60 results from the combination of the forward motion of the aircraft 2 and the powered rotational speed of the rotor blade 36. When the speed of the relative wind 60 approaches the speed of sound, compressibility effects 62 occur in the form of shock waves.

While some predetermined compressibility effect 62 may be acceptable, compressibility effects 62 generally are undesirable and are to be avoided due to excess vibration and noise. The predominant contributor to the relative wind 60 of the rotor blade 36 under power is the high-speed powered rotation of the rotor blade 36. The powered rotation of the rotor blade 36 therefore is the principal contributor to compressibility effects 62.

The control system 38 monitors aircraft conditions 42 relating to compressibility effects 62, for example, the airspeed of the fuselage 4 and the powered rotational speed of the rotor 20. When the control system 38 determines that the relative wind 60 may approach a predetermined value for relative wind 60, the control system 38 will initiate steps to slow the rotor blade 36 and to prevent or delay the onset of those compressibility effects 62. For example, when the control system determines that the airspeed of the fuselage of the aircraft has reached a predetermined airspeed, the control system 38 may initiate the steps to slow the rotor 20 described in the following paragraphs.

To prevent or to delay the onset of compressibility effects 62, the control system 38 of the compound aircraft 2 unloads the rotor 20 by selecting the cyclic and the collective pitch of the rotor 20 to feather the rotor blades 36. Feathering the rotor blades 36 reduces the lift generated by the rotor 20 and reduces the engine power consumed by the rotor 20. The control system 38 concurrently directs that engine power to the thruster 24 by selecting an angle of attack of the thruster blades 34 to increase the forward thrust. The control system 38 also concurrently adjusts the angle of attack of the variable incidence wings 6 to provide more lift. The control system 38 then activates the clutch effector 45 and disengages the clutch 30, removing engine 28 power to the rotor transmission 32 and hence to the rotor blade 36. The control system 38 disengages the clutch 30 so that the rotor 20 slows and the relative wind 60 does not exceed a predetermined value that would cause a predetermined compressibility effect 62.

Figure 9:
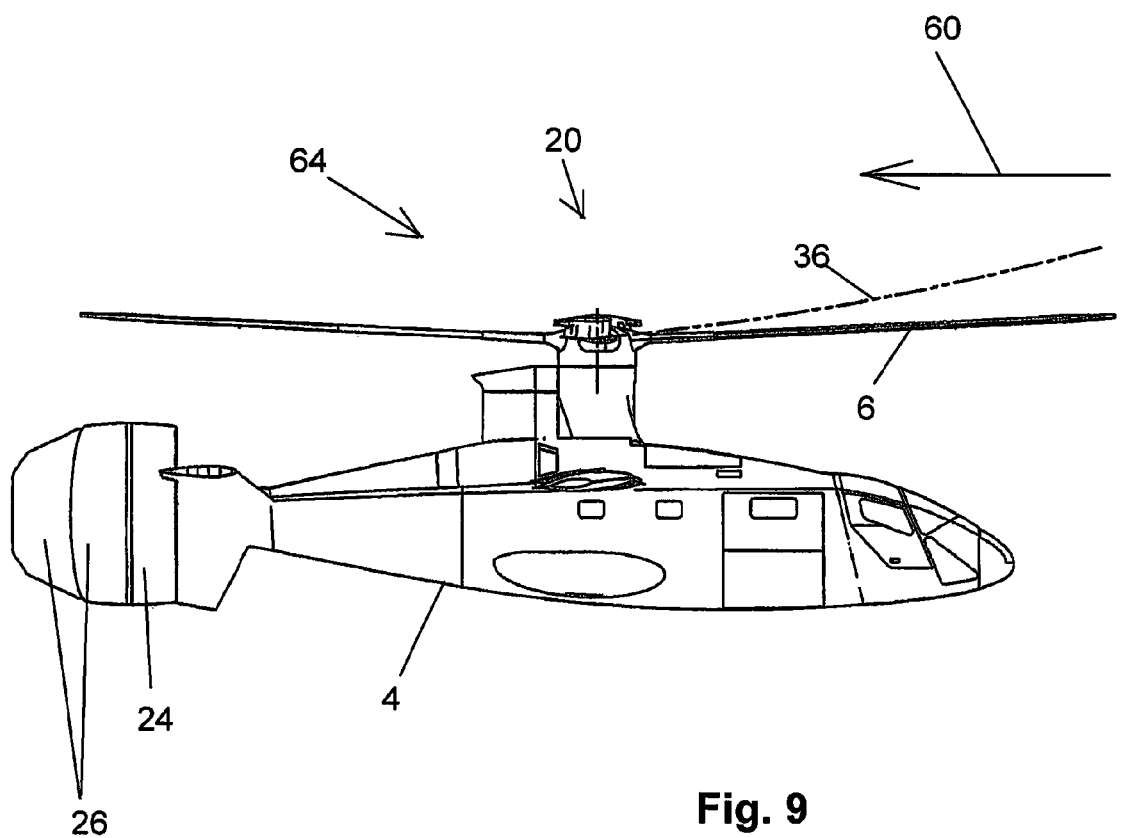
FIG. 9 is side view of the compound aircraft showing excess deformation of the rotor blade.

Without power, the rotor 20 will slow to a stop unless the rotor 20 is configured for autorotation. A stopped rotor 20 or a rotor 20 that is rotating too slowly is not desirable because the aerodynamic forces of the relative wind 60 acting on the long, flexible rotor blades 36 may cause the rotor blades 36 to become unstable and to deform excessively, as shown by the dashed lines of FIG. 9. Instability and excess deformation of the rotor blades 36 will cause excess vibration and may result in catastrophic failure of the rotor blades 36.

Figure 10:
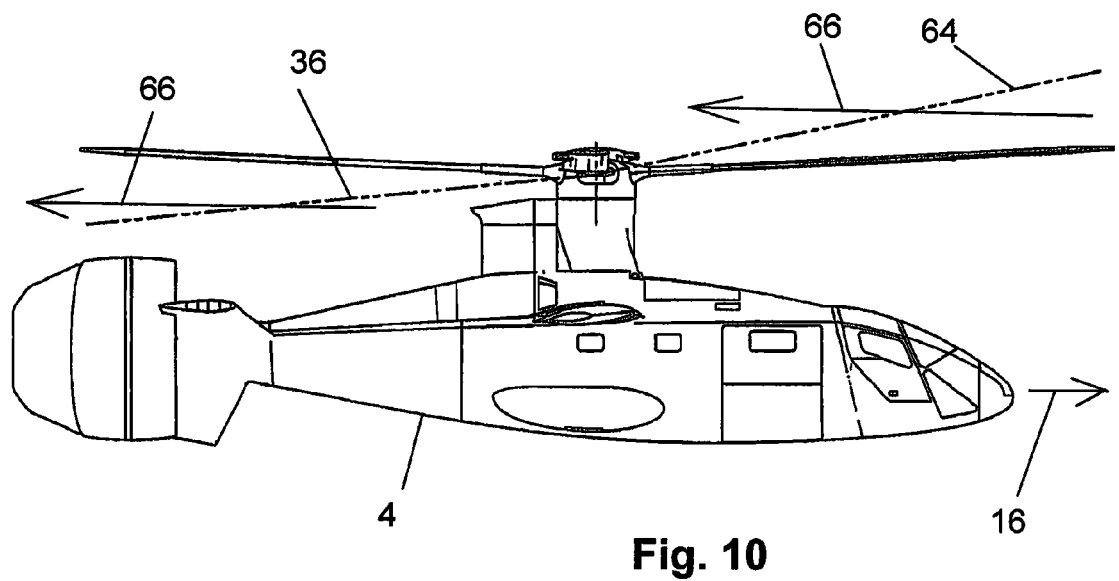
FIG. 10 is a side view of the compound aircraft configured for autorotation.

To prevent instability and excessive deformation of the rotor blades 36 due to the relative wind 60 when the clutch 30 is disengaged, the rotor 20 is configured to autorotate, as shown by FIG. 10. When clutch 30 initially is disengaged, the rotor 20 continues to rotate temporarily due to the inertia of the spinning rotor 20. The control system 38 selects settings for the cyclic pitch effector 46 and the collective pitch effector 48 that tilt the rotor disc 64 aft, as indicated by dashed lines on FIG. 10. The motion of the aircraft 2 in the forward direction 16 causes air to move through the rotor disc 64 from the bottom side of the rotor disc 64 to the top side of the rotor disc 64, as shown by lines 66 on FIG. 10. The control system selects cyclic pitch effector 46 settings and collective pitch effector 48 settings that cause the rotor 20 to autorotate; that is, that cause the rotor 20 to rotate in response to the air moving through the passively-turning rotor disc 64 from the bottom of the disc 64 to the top of the disc 64. The air moving from the bottom to the top of the rotor disc 64 causes the rotor 20 to rotate in the same manner that blowing on a pinwheel causes the pinwheel to rotate.

The rotational speed of the autorotating rotor 20, referred to herein as the 'autorotating rotational speed' is controlled by the control system 38 by activation of the cyclic pitch effector 46 and the collective pitch effector 48. The autorotating rotational speed is selected so that the rotor blades 36 are rotating at an adequately high rate that the inertia of the spinning rotor blades 36 is adequate to maintain the mechanical stability of the rotor 20 and prevent excessive deformation of the rotor blades 36 in response to the aerodynamic forces resulting from the relative wind 60, all with an adequate margin of safety. As used herein, the term 'excessive deformation' means deformation exceeding a predetermined allowable deformation of the rotor blades 36.

The control system 38 also controls the autorotating rotational speed to be adequately low so that the relative wind 60 does not cause compressibility effects 62 that are greater than a predetermined compressibility effect 62 that is determined to be allowable.

The control system 38 also may select a transition from powered rotor 20 to autorotating rotor 20 flight for reasons other than avoidance of compressibility effects. For example, the control system 38 may monitor the airspeed of the fuselage 4 in the forward direction 16. At a predetermined airspeed the control system 38 may transition from powered rotor 20 to autorotating rotor 20 flight for improved fuel economy, reduction in vibration or to decrease lifecycle cost for the compound aircraft 2.

I claim:

1. A compound aircraft, the aircraft comprising:
  a. a fuselage;
  b. a variable incidence wing configured to provide a lift to said fuselage in response to a movement of the aircraft in a forward direction, said movement of said aircraft in said forward direction defining an airspeed of said fuselage;
  c. a thruster attached to the fuselage, said thruster being configured to apply a selectable forward thrust to said fuselage;
  d. an engine, said engine being connected to said fuselage;
  e. a clutch, said clutch being connected to said engine;
  f. a rotor configured for a rotation, said rotor having a rotor blade, said rotor blade having a selectable collective pitch and a selectable cyclic pitch, said engine being configured to selectably apply a power to said rotor through said clutch, said clutch being configured to selectably disengage said rotor from said engine, said rotor, said clutch and said engine being configured to support selectably the compound aircraft in a hovering flight
  g. a control system, said control system being attached to said fuselage;
  h. a sensor, said sensor being configured to detect an aircraft condition, said sensor being configured to communicate said aircraft condition to said control system;
  i. a collective effector and a cyclic effector, said collective and said cyclic effectors being operably attached to said control system, said collective effector being configured to control said collective pitch of said rotor blade, said cyclic effector being configured to control said cyclic pitch of said rotor blade, said control system being configured to select said collective pitch and said cyclic pitch based upon said aircraft condition, said aircraft condition comprising said airspeed of said fuselage wherein said control system is configured selectably to disengage said clutch and to select said collective pitch and said cyclic pitch of said rotor blade that will cause an autorotation of said rotor when said airspeed of said fuselage is sufficient to cause said variable incidence wing to supply said lift to said fuselage sufficient to support the compound aircraft in flight and wherein said rotor has an autorotating rotational speed when said rotor is autorotating, said control system being configured to select said cyclic and said collective pitch of said rotor to select said autorotating rotational speed, said airspeed of said fuselage causing an aerodynamic force against said rotor blade when said rotor is autorotating, said rotor blade being configured so that if said autorotating rotational speed falls below a predetermined minimum that said blade will exceed said allowable deformation due to said aerodynamic force, said control system being configured to select said autorotating rotational speed that is greater than said predetermined minimum autorotating rotational speed.

2. The compound aircraft of claim 1 wherein said rotor blade is configured to experience a relative wind as a result of said airspeed of said fuselage in combination with said autorotation of said rotor and wherein said rotor blade is configured to experience a pre-determined compressibility effect based on said relative wind, said control system being configured to select said autorotating rotational speed such that said rotor does not exceed said predetermined compressibility effect when said rotor autorotates.

3. The compound aircraft of claim 1 wherein said rotor blade is configured to experience a relative wind as a result of said airspeed of said fuselage in combination with said rotation of said rotor, and wherein said rotor blade is configured to experience a pre-determined compressibility effect based on a predetermined speed of said relative wind, said control system being configured to selectably disengage said clutch and to select said collective pitch and said cyclic pitch of said rotor that will cause said autorotation of said rotor at less than said predetermined speed of said relative wind, whereby said rotor blade does not experience said predetermined speed of said relative wind and said predetermined compressibility effect.

4. The compound aircraft of claim 1 wherein said variable incidence wing has a wing axis of rotation, said variable incidence wing being rotatable about said wing axis of rotation between a cruise position and a hover position, said variable incidence wing having a chord, said chord being generally parallel to said direction of forward movement when said variable incidence wing is in said cruise position, said chord being generally parallel to a rotor axis of rotation when said variable incidence wing is in said hover position.

5. The compound aircraft of claim 1 wherein said control system is configured to select said autorotating rotational speed such that said rotor does not provide substantial said lift to said fuselage.

6. A method of flight, the method comprising:
  a. Providing a compound aircraft having a fuselage, a variable incidence wing attached to said fuselage, said variable incidence wing being configured to selectably supply a lift to said fuselage in response to a movement of the aircraft in a forward direction, said movement of said aircraft in said forward direction defining an airspeed of said fuselage, a thruster attached to said fuselage, said thruster being configured to apply a selectable forward thrust to said fuselage, an engine, said engine being connected to said fuselage, a clutch, said clutch being connected to said engine, a rotor configured for rotation, said rotor having a rotor blade, said rotor blade having a selectable collective pitch and a selectable cyclic pitch, said rotor being selectably attached to said engine through said clutch, said clutch being configured to selectably disengage said rotor from said engine;

b. Hovering said compound aircraft by applying a power to said rotor by said engine through said clutch and by selecting said collective pitch and said cyclic pitch of said rotor blade that are consistent with said hovering;

c. Accelerating said compound aircraft in said forward direction until said fuselage reaches a predetermined airspeed;

d. Disconnecting said rotor from said engine by disengaging said clutch;

e. Autorotating said rotor by selecting said cyclic pitch and said collective pitch that are consistent with said autorotation;

f. Maintaining said predetermined airspeed while said rotor is autorotating, said airspeed of said fuselage causing an aerodynamic force against said rotor blade when said rotor is autorotating, said rotor having an autorotating rotational speed when said rotor is autorotating, said autorotating rotational speed being selectable by adjusting said cyclic and said collective pitch of said rotor blade, said rotor blade having an allowable deformation in flexure, said rotor blade being configured so that if said autorotating rotational speed falls below a predetermined minimum that said blade will exceed said allowable deformation due to said aerodynamic force; and g. activating an effector to select said autorotating rotational speed to be sufficient to prevent a deformation greater than said predetermined allowable deformation of said rotor blade in response to said aerodynamic force when said compound aircraft is in flight.

7. The method of claim 6 wherein said step of selecting said autorotating rotational speed further comprises: selecting said autorotating rotational speed to be less than that which in combination with said airspeed of said fuselage will cause said predetermined compressibility effect on said rotor blade.

8. The method of claim 7 wherein said variable incidence wing is rotatable about a variable incidence wing axis of rotation, the method further comprising:

rotating said variable incidence wing about said variable incidence wing axis of rotation from a hover position to a cruise position, said variable incidence wing having a chord, said chord of said variable incidence wing being generally parallel to said direction of forward movement when said variable incidence wing is in said cruise position, said chord being generally parallel to a rotor axis of rotation when said variable incidence wing is in said hover position.

9. A compound aircraft, the aircraft comprising:

a. a fuselage;

b. a variable incidence wing configured to provide a predetermined lift to said fuselage in response to a movement of the aircraft in a forward direction, said movement of said aircraft in said forward direction defining an airspeed of said fuselage;

c. a thruster attached to the fuselage, said thruster being configured to apply a selectable forward thrust to said fuselage;

d. an engine, said engine being connected to said fuselage;

e. a clutch, said clutch being connected to said engine;

f. a rotor configured for a rotation, said rotor having a rotor blade, said rotor blade having a selectable collective pitch and a selectable cyclic pitch, said engine being configured to selectably apply a power to said rotor through said clutch, said clutch being configured to selectably disengage said rotor from said engine, said rotor, said clutch and said engine being configured to support selectably the compound aircraft in a hovering flight;

g. a control system, said control system being operably connected to said engine, said clutch, said rotor, said wing and said thruster;

h. a sensor, said sensor being configured to detect an aircraft condition, said sensor being configured to communicate said aircraft condition to said control system, said aircraft condition comprising said airspeed of said fuselage;

i. a collective effector and a cyclic effector, said collective and said cyclic effectors being operably attached to said control system, said collective effector being configured to control said collective pitch of said rotor blade, said cyclic effector being configured to control said cyclic pitch of said rotor blade, said control system being configured selectably to disengage said clutch and to select said collective pitch and said cyclic pitch of said rotor blade that will cause an autorotation of said rotor when said airspeed of said fuselage is sufficient to cause said variable incidence wing to supply said predetermined lift to said fuselage, said rotor having an autorotating rotational speed when said rotor is autorotating, said control system being configured to select said cyclic and said collective pitch of said rotor to select said autorotating rotational speed of said rotor, said airspeed of said fuselage causing an aerodynamic force against said rotor blade when said rotor is autorotating, said rotor blade being configured so that if said autorotating rotational speed falls below a predetermined minimum that said blade will exceed said allowable deformation due to said aerodynamic force, said control system being configured to select said autorotating rotational speed that is sufficient to prevent a deformation greater than said predetermined allowable deformation of said rotor blade in response to said aerodynamic force.

* * * * *